(12) United States Patent
Carson et al.

(10) Patent No.: US 6,715,122 B2
(45) Date of Patent: Mar. 30, 2004

(54) COPY PROTECTION THROUGH SYMBOL SUBSTITUTION AND INDUCED ERRORS

(75) Inventors: Douglas M. Carson, Cushing, OK (US); Henry B. Kelly, Stillwater, OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 333 days.

(21) Appl. No.: 09/792,000

(22) Filed: Feb. 23, 2001

(65) Prior Publication Data

US 2001/0028615 A1 Oct. 11, 2001

Related U.S. Application Data

(60) Provisional application No. 60/184,230, filed on Feb. 23, 2000.

(51) Int. Cl.[7] .............................................. G11C 29/00
(52) U.S. Cl. ...................... 714/769; 713/193; 380/201; 369/47.12; 369/53.21
(58) Field of Search ........................ 713/193; 380/200, 380/201; 714/769, 751, 755, 748, 820–822, 770, 747; 369/47.12, 53.21

(56) References Cited

U.S. PATENT DOCUMENTS

| | | | |
|---|---|---|---|
| 5,148,431 A | * | 9/1992 | Hayashi ...................... 714/704 |
| 5,408,531 A | * | 4/1995 | Nakajima ..................... 705/57 |
| 5,513,260 A | | 4/1996 | Ryan |
| 5,548,595 A | * | 8/1996 | Hirayasu ..................... 714/708 |
| 5,659,613 A | * | 8/1997 | Copeland et al. ........... 380/202 |
| 5,742,735 A | | 4/1998 | Eberlein et al. |
| 5,761,301 A | * | 6/1998 | Oshima et al. ............... 705/57 |
| 6,353,890 B1 | * | 3/2002 | Newman ..................... 713/193 |

FOREIGN PATENT DOCUMENTS

| | | | |
|---|---|---|---|
| JP | 0533204 A2 | * | 9/1992 |
| WO | WO 98/54713 | | 12/1998 |

* cited by examiner

*Primary Examiner*—Guy J. Lamarre
(74) *Attorney, Agent, or Firm*—Fellers, Snider, et al.

(57) ABSTRACT

Method and apparatus for preventing unauthorized replication of a digital data file. A plurality of second data set samples are substituted for a plurality of user data samples in a user data sequence to generate a combined data set. Error correction codes are calculated to correct errors in the combined data set. Uncorrectable errors are then intentionally written to the error correction codes corresponding to the second data set samples so that, during playback, the readback system conceals the corresponding second data set samples. An unauthorized copy of the digital data file will not include the uncorrectable errors; thus, the same readback system will output both the user data samples and the second data set samples, with the second data set samples interfering with the integrity of the user data samples.

19 Claims, 7 Drawing Sheets

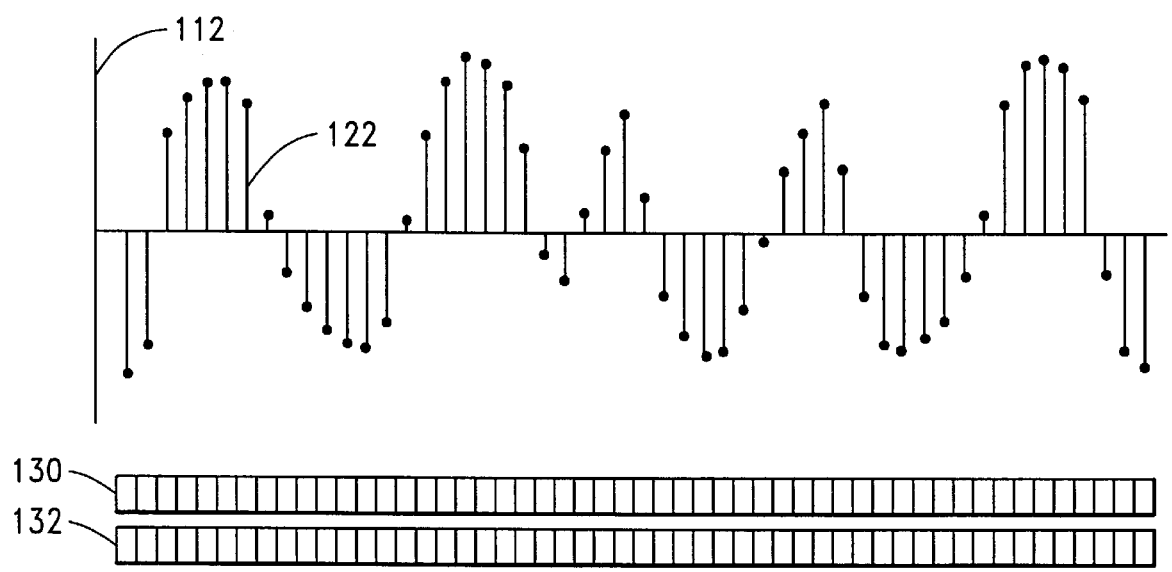
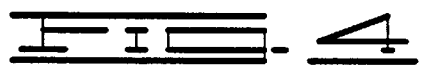
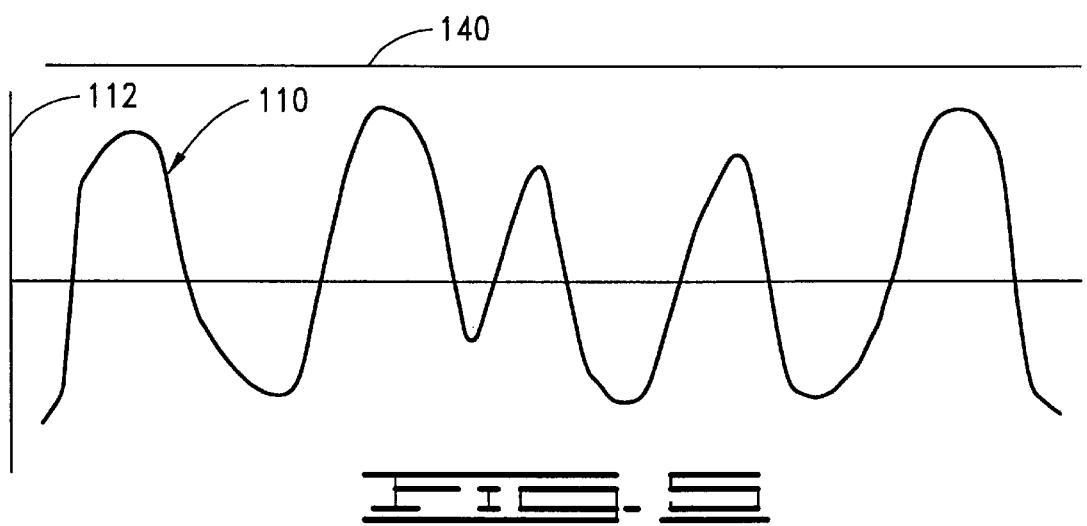
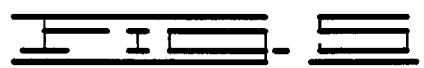

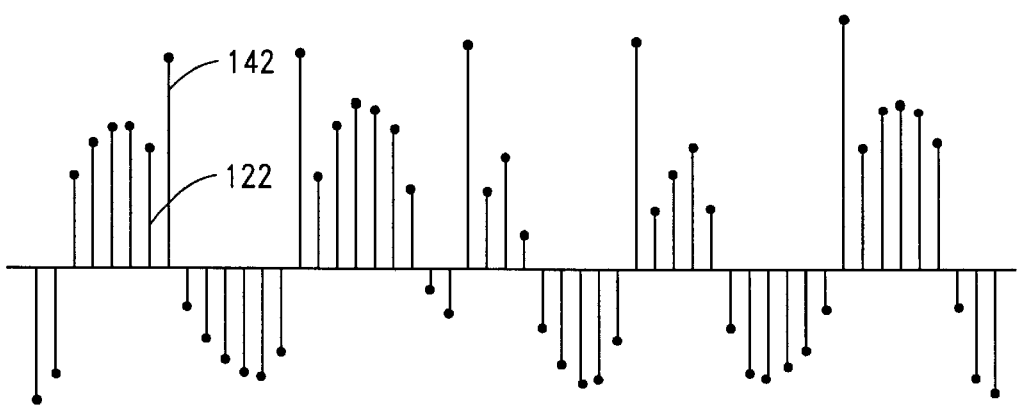
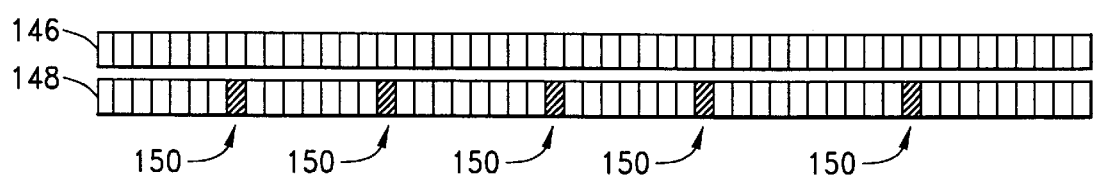
FIG. 6
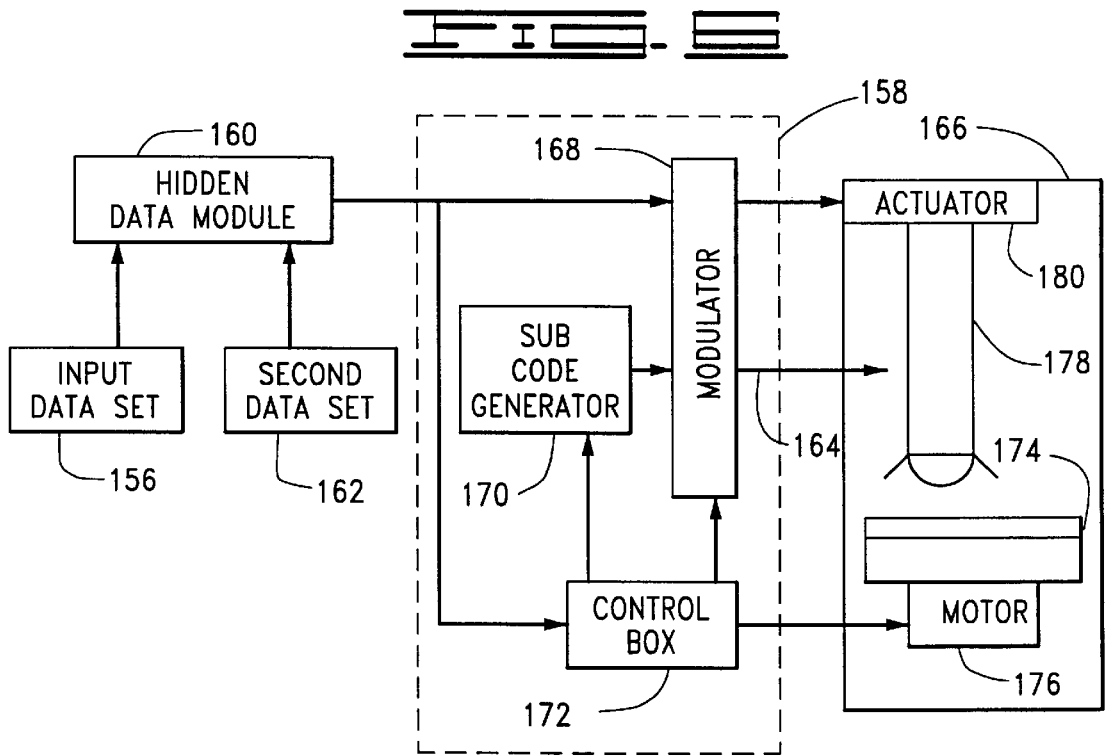
FIG. 7

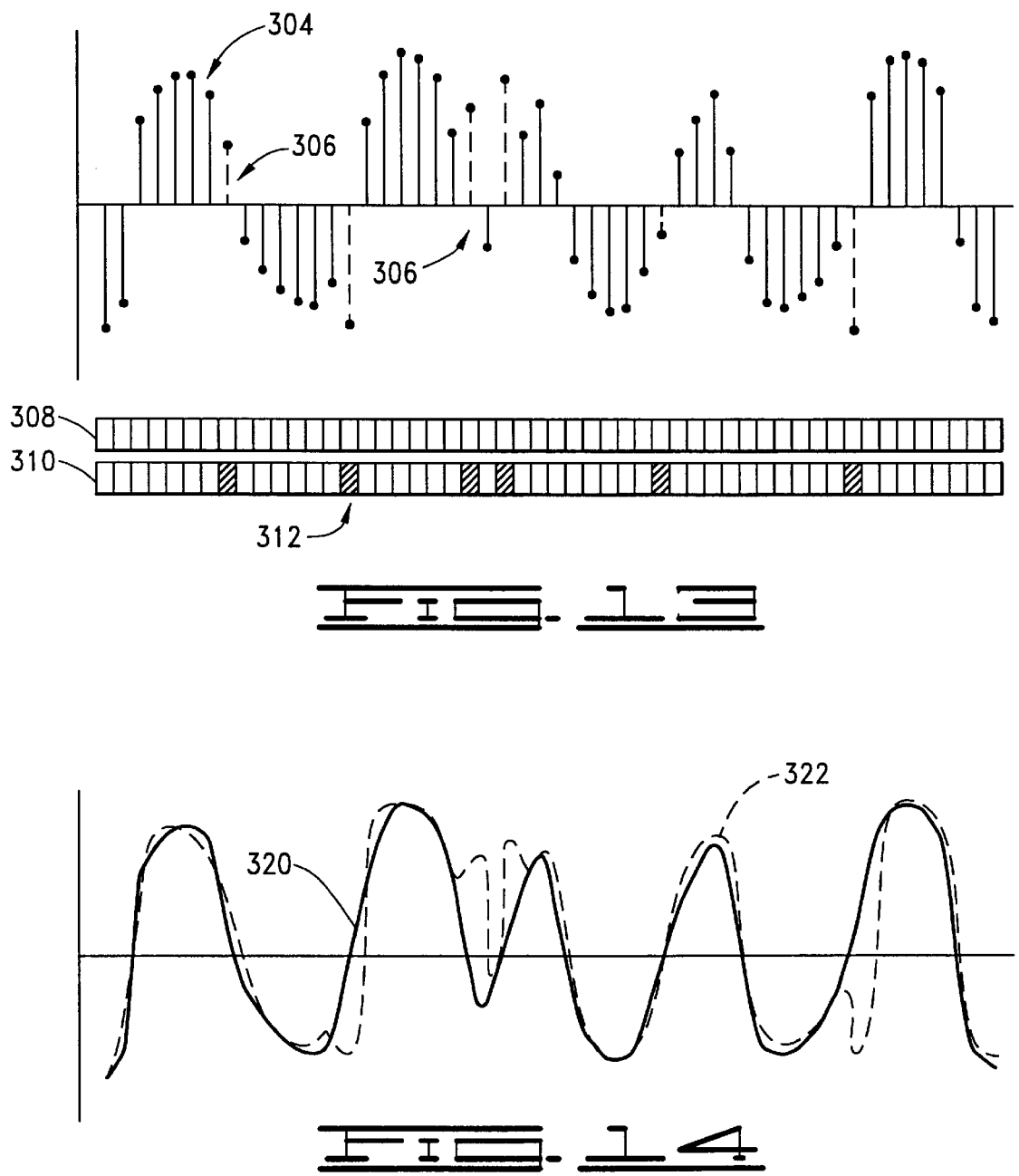

COPY PROTECTION THROUGH SYMBOL SUBSTITUTION AND INDUCED ERRORS

RELATED APPLICATIONS

This application claims priority to U.S. Provisional Application No. 60/184,230 filed Feb. 23, 2000.

FIELD OF THE INVENTION

The present invention relates generally to the field of copy protection of a digital data file and more particularly, but without limitation, to the placement of copy protection on an optical disc by substituting second data set samples for user data samples and writing induced errors therein.

BACKGROUND

Optical discs have become increasingly popular as an efficient and cost-effective storage medium for digitally stored data. A typical optical disc comprises a circular disc having a recording layer of light reflective material embedded in a refractive substrate. The recording layer is disposed along a plane substantially normal to an axis about which the disc is rotated and stores data in the form of localized pits and lands (also sometimes referred to as "marks" and "spaces") along a continuously extending spiral track. The length of each pit and land corresponds to one of a selected number of data symbols (for example, from 3T to 11T, with T of determined length).

The data symbols are recovered from the disc through the use of a light source (such as a laser) which applies light of selected wavelength to the rotating disc and a transducer which generates a readback signal indicative of the data in relation to the relative differences in reflectivity of the pits and lands. It is common to separate the relative elevations of the pits and the lands by a distance equal to a quarter-wavelength of the applied light so as to facilitate a substantial change in the amount of light reflected by the pits as compared to the amount of light reflected by the lands.

One popular optical disc format is commonly referred to as compact disc, or CD, which has found widespread use in recent years in computer applications (such as CD-ROM) and in the music recording industry (audio CDs). A CD has an outer diameter of 120 millimeters (4.724 inches) and a data storage capacity of about 650 megabytes (MB). Another popular optical disc format is commonly referred to as digital versatile disc, or DVD. DVDs of the current generation have the same form factor as CDs, but store about 4.7 gigabytes (GB) per recording layer.

Due to the worldwide consumer demand for the types of information available on optical discs (e.g. software and music), combined with the relative ease with which unauthorized copies of optical discs can be generated, suppliers of optical discs have attempted to implement various copy protection schemes to restrict unauthorized replication of the disc. One type of copy protection involves configuring an optical disc in such a manner so that an authorized copy functions properly in a readback system, but an unauthorized copy is prevented from doing so. Another type of copy protection provides a forensic tracking scheme by storing certain "marking" or "tracking" information on the disc, with this information relating to the source of the disc, the mastering data and so on. The forensic information, generally, does not prevent an unauthorized copy from functioning in the readback system, but based on the presence or absence of the information, a determination can be made whether a particular optical disc is in fact an authorized copy.

One particularly common copy protection scheme for CDs involves manipulation of the error correction system. As will be recognized by those skilled in the art, CDs generally utilize three levels of error correction, referred to as C1, C2, and Level 3. The C1 codes are parity words determined from the user data, the C2 codes are error correction codes (ECC, such as Reed-Solomon codes) calculated from the user data and the C1 codes, and Level 3 are top-level parity words. These levels of error detection and correction codes are accordingly calculated and stored as the user data are written to the discs and each provide successively higher levels of error detection and correction capabilities for the associated user data. That is, if errors cannot be corrected from the C1 codes, the C2 codes are employed, and if the C2 codes are unsuccessful, then the Level 3 parity words correct the errors.

Purposefully writing erroneous ("bad") C2 codes at a few selected locations on the disc will result in a particular signature that would not normally occur during normal C2 calculation steps. Thus, if the optical disc is a CD-ROM, an active application resident in a computer can first check the CD-ROM to ensure the bad C2 codes are present at the selected locations to verify that the CD-ROM is an authorized copy. If the C2 codes are not bad at the selected locations, the application can report an error and prevent the user from using the CD-ROM.

While operable, there are disadvantages with this type of copy protection approach. Manipulating the error correction system results in some degradation of the error correcting capabilities of the disc, at least potentially making the disc unusable if enough errors arise over time that cannot be adequately corrected using the C1 and Level 3 codes.

Such manipulation also results in optical discs that technically do not meet the various CD industry format standards, and accordingly, the bad C2 codes are easily detectable by standard test equipment used to verify optical disc replicas. Thus, during manufacturing by an authorized replication source, the detected errors will be reported for every replicated disc. These reported errors will have to be investigated to determine whether the errors are valid errors, or errors due to the copy protection scheme (and should thus be ignored). To increase the efficiency of the testing of optical discs having these C2 errors, often times test equipment are instructed to ignore specific sections of the optical disc, as many of the errors are intentional, and not due to manufacturing errors. When this occurs, any actual errors are overlooked, therefore the integrity of the optical disc is jeopardized by this copy protection scheme.

More importantly, because the bad C2 codes are easily detected, an unauthorized source can insert bad C2 codes in the appropriate locations in the master disc and defeat the copy protection scheme altogether. Since audio CDs do not use a resident computer application that can initially verify the authenticity of the disc, this type of protection scheme is usually not applicable to audio CDs.

When a reading device encounters an error, it attempts to correct the error using the resident error correction codes. Should this error be of such magnitude that the error correction codes are incapable of reproducing the correct signal, the optical reading device works to conceal the error. The error in an audio CD, without concealment, may result in an audible click and disrupt the enjoyment of the audio track. The error concealment system, usually incorporated within the digital to analog converter of the optical reading device, employs interpolation and muting processes to conceal the error. The system is notified of the error by an analog correction flag produced by the demodulating system, and based on several factors, the system makes a determination of how to most effectively conceal the error. The system may interpolate the last known value and the next known value to approximate the missing value, mute the output signal for the duration of the error using the players internal muting method, or simply hold the last known value for the duration of the error. All these techniques are implemented to provide an inaudible concealment of the uncorrectable error.

Due to the disparity in how different optical discs are accessed, some having a resident computer application and others simply processing the encoded data, there is a need for a copy protection scheme which prevents the unauthorized duplication of an original disc by a typical mastering or recording device but does not otherwise interfere with the output of the user data, such scheme operable in different types of readback systems.

SUMMARY OF THE INVENTION

The present invention is directed to a copy protection scheme for the prevention of the unauthorized duplication of user data without adversely affecting the integrity of the user data itself. More specifically, the present invention is directed to the placement of a copy protection scheme on an optical disc to prevent unauthorized duplication of the optical disc by a typical mastering configuration or recording device. The copy protection scheme is discussed as applicable to an optical disc, and more specifically an audio CD, but the present invention is fully applicable to any data set capable of being digitally represented and having error correction codes incorporated therein.

The copy protection scheme is created by superimposing (intermingling) a second data set with the user data at specific locations by substituting data samples of the second data set in place of user data samples. At the location where the second data set samples are written over and replace the user data samples, an uncorrectable error (CU) is written.

When a reading device reads the user data and encounters the CU, it will be instructed to ignore the data sample written therein as being incorrect and will activate its internal error concealment steps to compensate accordingly. Therefore, the output of the user data signal will be an almost exact replication of the original signal prior to the substitution of the second data set therein with no intelligible distortion to the output signal due to the second data sample being concealed.

In the case of an optical disc reader, when the reader encounters an uncorrectable error, the error concealment system can hold the last sample until the next readable sample, mute the output until the next readable sample, or interpolate the sample based on the value of other samples. All of these CU compensation operations occur with minimal interference to the audio output.

When the user data are illegally copied, the copy protection scheme of the present invention prevents the reconstruction of the original signal. In the extraction of the user data for recording purposes, the CUs are not made a part of the output signal and the error concealment steps are not taken. Therefore, the second data set samples substituted into the user data set are made a part of the original signal without any internal notification for a reading device to ignore or conceal the data set sample values. An output signal which is distinctly different from the original user data signal is created. In the case of an audio disc, the audio output may comprise the original data (e.g. songs) with a disruptive second track of sounds superimposed thereon, such as a high frequency warble, a series of clicks, or a human voice which states that this is an unauthorized disc.

Other features and advantages which characterize the present invention will be apparent from a review of the following detailed description section in conjunction with the appended drawings.

BRIEF DESCRIPTION OF THE DRAWINGS

FIG. 4 is a representation of FIG. 2 in digital format including format tables for storing the sample value and its accompanying error correction codes prior to being written to an optical disc.

FIG. 5 is a representation of the signal of FIG. 2 also having a second data set included therein.

FIG. 6 is a representation of the signal of FIG. 5 in digital format with its accompanying sample value and error correction codes prior to being written to a disc.

FIG. 7 is a representation of a disc mastering system used to create a disc master having the copy protection of the present invention encoded therein.

FIG. 13 is a digital representation of the combination of the two analog signals of FIG. 12 where corresponding second data set samples have been substituted for user data set samples having a magnitude close to a zero crossing.

FIG. 14 is a direct comparison of the analog outputs of the digital signal of FIG. 13 as produced using a reading device and a spin stand.

DETAILED DESCRIPTION

Figure 1:
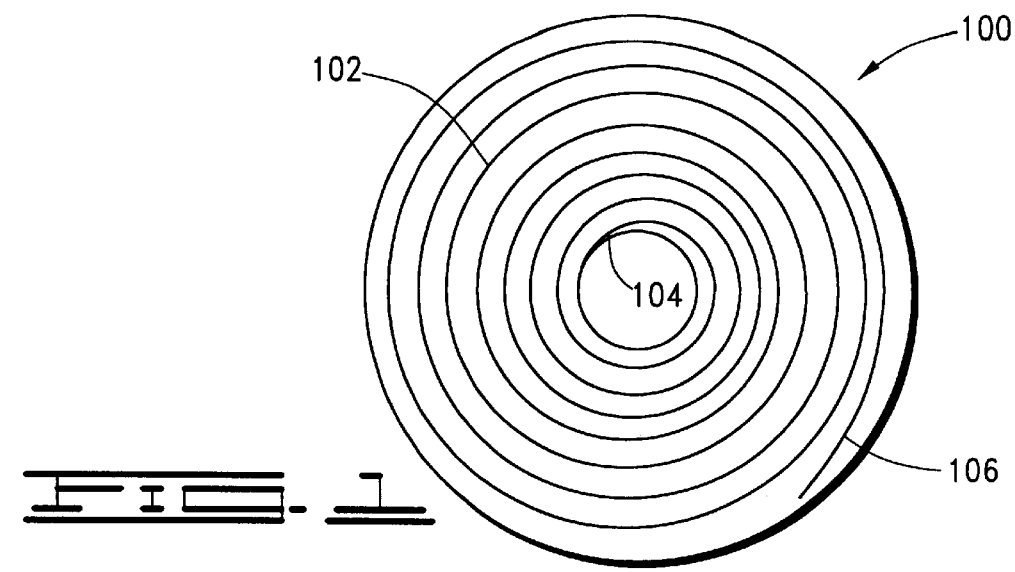
FIG. 1 is a representation of an optical disc having an exaggerated view of a spirally extending continuous data track.

FIG. 1 represents a typical optical disc 100 upon which the copy protection of the present invention may be encoded. The disc 100 is provided with an exaggerated view of a continuous spiral track 102 extending from a lead-in zone 104 to a lead-out zone 106. The track 102 contains the user data, whereas the lead-in zone 104 and the lead-out zone 106 are directed to controlling the orientation an optical pick-up device. The user data is written to the disc in a digital format, represented by the pits and lands, as discussed above.

Figure 2:
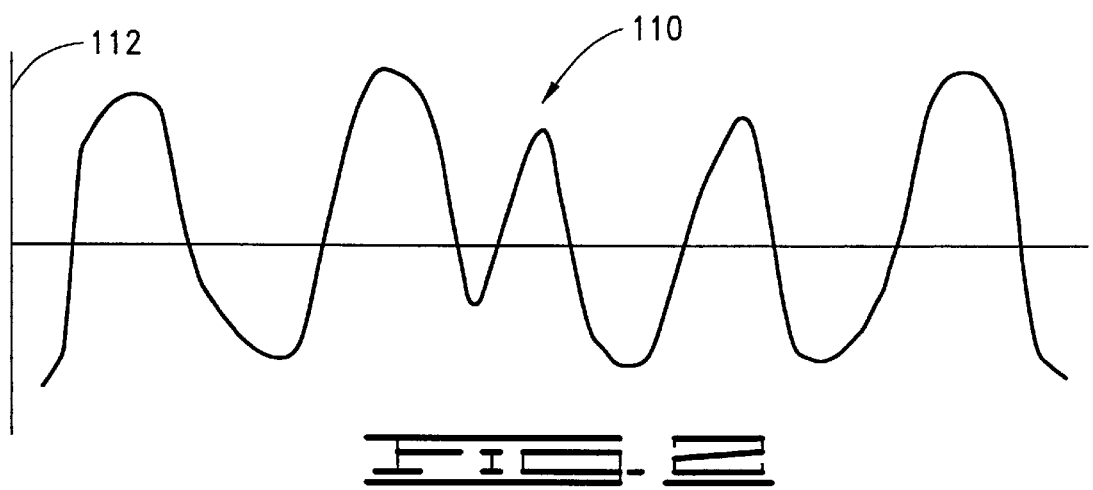
FIG. 2 is a sample analog signal representing a portion of an audio signal to be written to an optical disc.

Using the example of an audio CD to better explain the present invention, FIG. 2 is an exaggerated view of a typical analog audio signal 110. This signal may be representative of the audio signal prior its encoding on the disc or the output of the user data from an authorized copy. Furthermore, the signal FIG. 2 is a sample of a larger audio signal and simply represents a small portion of the overall continuous audio signal.

Figure 3:
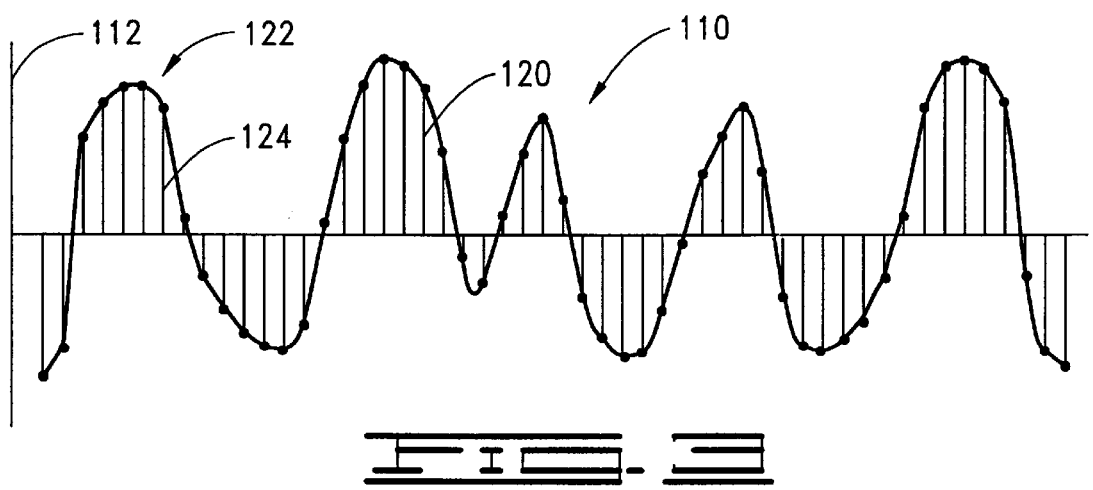
FIG. 3 is a representation of the signal of FIG. 2 in both its analog and digital form with a representational digital sample rate.

In order for an analog audio signal to be stored on an optical disc, it must first be converted into digital format and combined with proper error correction codes. FIG. 3 illustrates the data signal 110 of FIG. 2 shown in both analog form 120 and digital form 122 where the digital signal is composed of a plurality of discrete samples 124. FIG. 3 also illustrates the user data signal across the same magnitude range in both the analog signal 120 and the digital signal 122.

Further represented by the digital signal 122 is a frequency having a specific number of digital samples 124. In a typical CD, the digital signal frequency is 44.1 kHz or the presence of 44,100 discrete samples per second. For illustration purposes, the digital signal of FIG. 3 is shown with fewer number of samples.

The digital signal 122 of FIG. 3 is also represented in FIG. 4, along with a double-row table for housing the user data. The first row 130 holds the magnitude of the discrete sample and the second row 132 provides the proper error correction codes. In encoding the digital signal 122 to an optical disc, the magnitude of the sample is combined with appropriate error correction code and is encoded onto the disc.

FIG. 5 is an analog representation of the copy protection scheme of the present invention where the user data analog signal 110 is shown with a second data set 140. The second data set 140 is represented as a continuous signal at a specific magnitude, this data set consists of a low frequency signal having the purpose of distorting the user data set. Furthermore, the second data may be any data set which is not synchronic with the user data, such that when data samples of the second data set are substitutes for the data samples of the user data, the original analog user data signal will be effectively distorted. Examples of secondary data outputs suitable for an audio CD include a high frequency warble, a series of clicks, or a human voice with a message indicating the copy is unauthorized.

FIG. 6 illustrates the copy protection scheme of the present invention as it is applied to the user data and written to an optical disc. The digital signal 142 is represented as a plurality of discrete samples where a majority of the samples are derived from the user data samples 124. Although, some digital data samples 124 have been eliminated and corresponding samples 144 from the second data set have been written therein.

In the preferred embodiment, the user data samples 122 which have a magnitude within a specific pre-defined range are replaced by the second data set samples. The sample locations where the second data set samples are substituted and a CU is written therein, is chosen, in the preferred embodiment, close the zero crossing of the analog signal. The concealment steps taken to overcome the CUs are less likely to produce a noticeable result, such as an audible click, when the data sample is close to the zero-crossing. For instance, should the analog correction flag seek to mute the signal, the magnitude of the muted signal would be close to the zero crossing anyway. The magnitude of the pre-defined range should be such that only several continuous sample values are substituted therefor. A suitable range can be readily selected depending on the application.

Another aspect of the present invention is the proper insertion of the CU at the appropriate location. PCT International Publication No. WO 98/54712, incorporated herein by reference, discloses a common approach taken to insert a CU through the creation of false C1/C2 data remainders. When the reading device attempts to correct the data, a CU will be indicated. Other methods may be employed to create the CU, such as physically damaging the disc surface or overwriting the disc in the exact location to create the error. The present invention provides for the placement of the CU to provide the proper concealment of the second data set sample substituted within the user data set regardless of the particular methodology employed to generate the CU.

Also shown in FIG. 6 is a table having two separate rows. The first row 146 contains the magnitude of the corresponding sample. This value, in an optical CD, is a 16 bit binary integer representing two separate 8 bit values. The second row 148 contain the error correction codes which are combined with the first row magnitude values and encoded and written to the optical disc. As the copy protection scheme of the present invention requires the insertion of an induced uncorrectable error at the substituted sample location, the CUs are indicated by the darkened boxes, denoted at 150. Furthermore, the overall signal of FIG. 6 represents the distorted user data signal in digital format prior to the assertion of error concealment methods by an optical reading device.

FIG. 7 illustrates how the digital data of FIG. 6 are written to an optical disc. A user data set 156 is fed to a signal processing unit 158, but first it is processed by a hidden data module 160. The hidden data module also receives, as an input, a second data set 162. The hidden data module 160 overlays the second data with the user data by substituting the second data set digital samples in lieu of input data set digital samples preferably having magnitudes near the zero-crossing. The hidden data module 162 provides a combined digital data input to a signal processing unit 158 which processes the input data and provides a modulated signal 164 to a disc mastering system 166. The signal processing unit 158 is composed of a modulator 168, a subcode generator 170, and a control circuit 172. The digital data input is fed to a modulator where it is encoded with error correction code and modulated accordingly. Furthermore, the modulator 168 receives sub code bits from the subcode generator 170 where the bits are encoded along with the user data and written to the optical disc.

The control circuit 172 of the signal processing unit 162 also receives the hidden data module 160 output signal, having the hidden message encoded therein. The control circuit 172 then instructs the modulator 168 at the appropriate times corresponding to the locations of the substituted second data set sample, to interject a CU into the error correction codes. Therefore, the output signal 164 of the modulator 168 contains the modulated copy protected user data with the induced CUs and the modulated signal 164 is provided to the disc mastering system 166.

The disc mastering system 166 produces a glass master 174 which is rotated about a central axis by a motor 176. Suspended above the glass master 174 is a laser 178 which is positioned by an actuator system 180. The laser 178 receives the modulated signal 164 from the signal processing unit 162 and this signal is used to alternate the laser 178 in the ON and OFF states, etching pits and lands into the glass master 174.

Once all the data has been modulated and written to the glass master, the master is further processed to create a "stamper". Replicas of the optical disc are "stamped" out, the pits and lands, representing the user data, being created in a refractive material.

Therefore, a normal optical disc may be encoded using the copy protection scheme of the present invention. The present invention prevents unauthorized duplication of the optical disc by a continuous reading device, but does not affect the operation of the optical disc when read by a normal reading device. While the foregoing discussion has been provided in the context of glass mastering, other disc writing configurations can be used as well.

Figure 8:
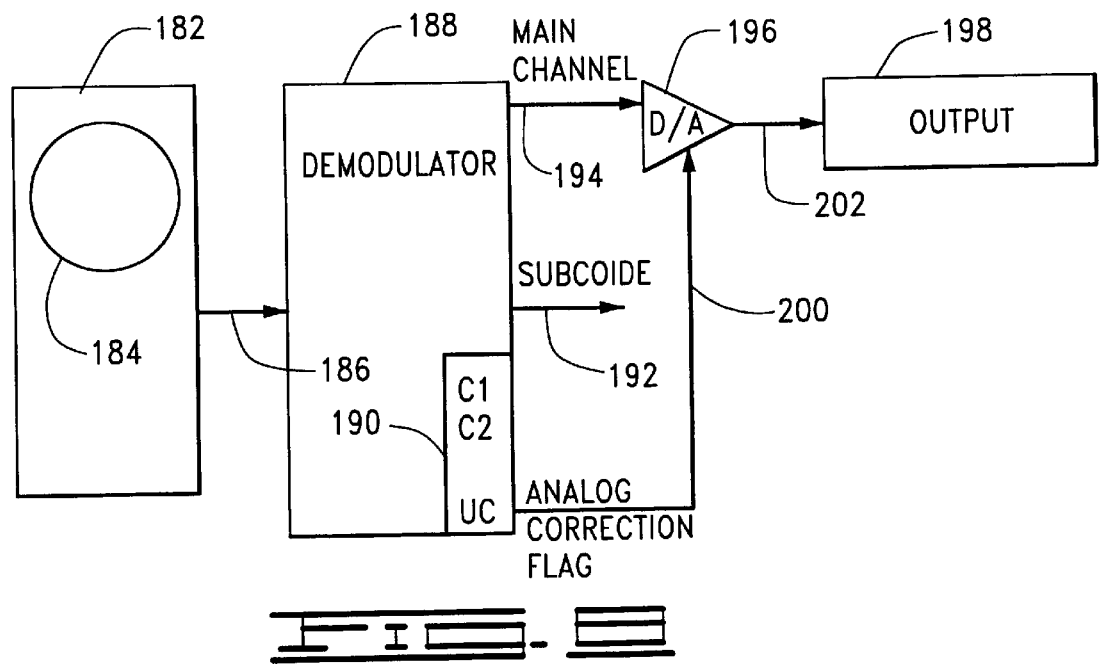
FIG. 8 is a representation of a normal optical reading device used to read and decode the data written on the optical disc with the inclusion of analog error correction to compensate for the presence of an uncorrectable error.

FIG. 8 represents a typical optical disc reading system having a reading device 182 capable of reading an optical disc 184 having the copy protection scheme of the present invention encoded therein. The output signal 186 of the reading device 182 is a modulated signal and is provided to a demodulator 188 where it is demodulated and reconstructed using the error correction codes.

Shown in FIG. 8, the sub code bits are parsed out by the decoder and made available to other output devices. The demodulator 188 also produces the main channel output 194, which is the reconstructed digital user data signal having substituted second data set samples therein, such as the signal of FIG. 6. The main channel signal 194 is processed by a digital to analog converter ("D/A") 196 whereupon the signal is converted into analog format for an output source 198, such as an audio speaker or a video monitor.

Further shown in FIG. 8 is a second input source to the D/A 196, an analog correction flag 200 created by the demodulator 188. This flag 200 notifies the D/A 196 that a specific data sample value is incorrect, as this flag is created by the presence of a CU in the error correction code. The D/A 196 then performs one of several functions to compensate for this CU. As discussed above, the D/A either holds the data sample, interpolates the sample value, or mutes the signal for the duration of the incorrect sample. Essentially, the analog correction flag 200 notifies the D/A 196 to ignore the actual value of the data sample and compensate accordingly so the incorrect data sample is not incorporated into the analog output signal 202 and prevented from being noticeable to the end user.

Figure 9:
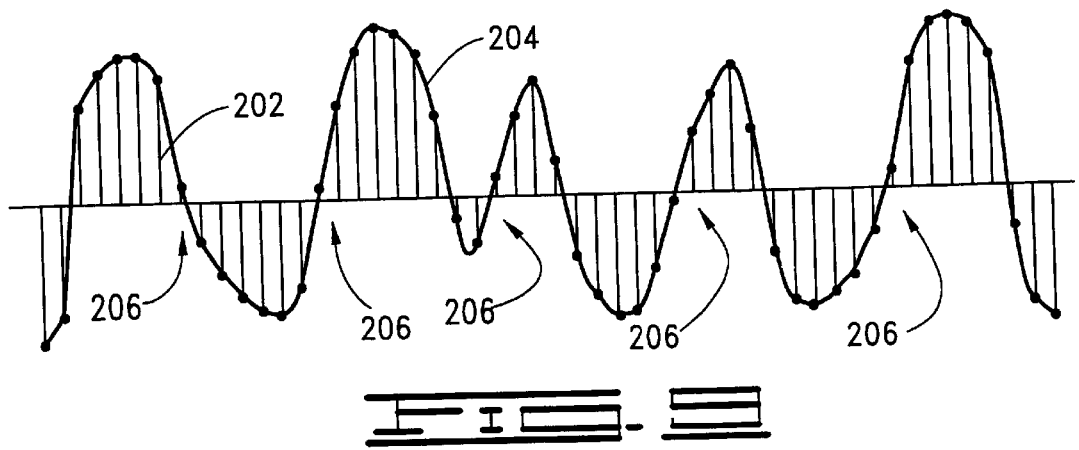
FIG. 9 is an analog and digital representation of the output signal of the optical disc reading system of FIG. 8.

FIG. 9 is an analog representation of the digital signal of FIG. 6 as it would appear as the D/A output signal 202. Further shown in FIG. 9, for illustration purposes, are the digital data samples 204 which compose the analog signal prior to conversion. The second data set samples which were encoded into the user data signal and written to the medium, do not appear in the output signal 202 as they have been eliminated by the analog correction flags 200 activated by the corresponding CUs 150. Therefore, shown at locations 206 are the compensation of the CU 150 by the D/A 200. Thus, a direct comparison of the output signal 202 of FIG. 9 with the original data signal 110 of FIG. 2 illustrates how the copy protection scheme of the present invention does not interfere with the original user data reconstructed from the optical disc by a normal reading device.

Figure 10:
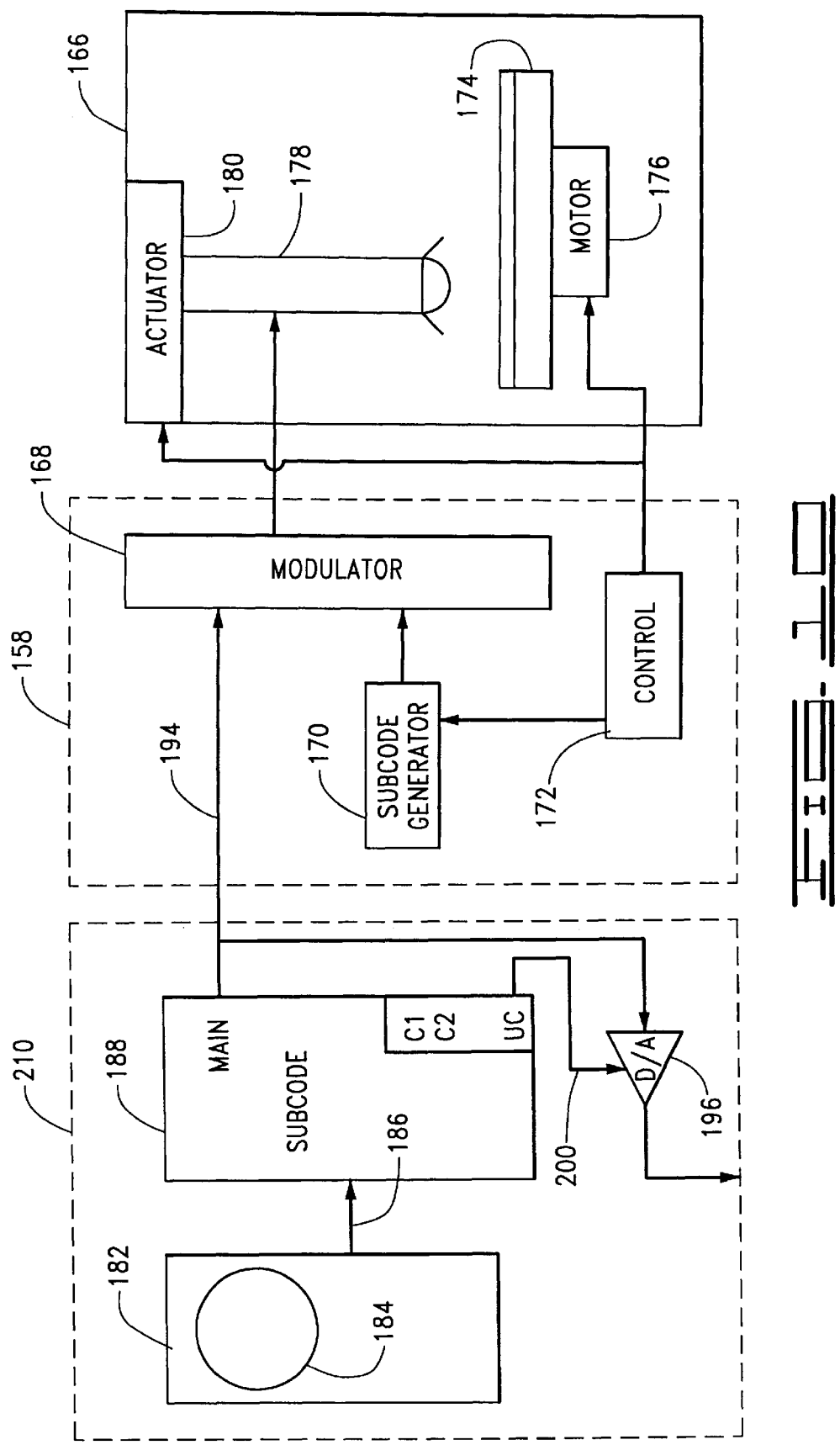
FIG. 10 is a typical mastering configuration or recording device.

FIG. 10 shows a typical disc mastering configuration or recording device consisting of a disc mastering system 166, a signal processing unit 158 and an optical disc reader system 210. The optical disc reader 182 reads the disc 184 and produces a modulated signal which is fed to a demodulation unit 188. The subcode and error correction codes are separated from the main channel data 194 and the main channel data is fed directly to the signal processing unit 158, without being processed by the D/A converter 196. Because the digital output main channel data 194 is not processed the D/A, the error correction codes 200 and subsequent concealment steps do not become a part of the signal fed to the modulator 168 of the signal processing unit 158.

The modulator 168 also receives input from a subcode generator 170 to produce a new modulated signal to the disc mastering system 166. Similar to the mastering process of FIG. 7, the control box 172 controls the rotation of the glass master and the position of the laser 178 via the actuator 180. The CU data signal 200 is not connected to the signal processor 162. The output 164 of the signal processor 158 or the modulator 168 contained therein, therefore the signal processing unit 158 modulated output signal will contain all of the main channel data contents 194 but will not contain any CUs.

Figure 11:
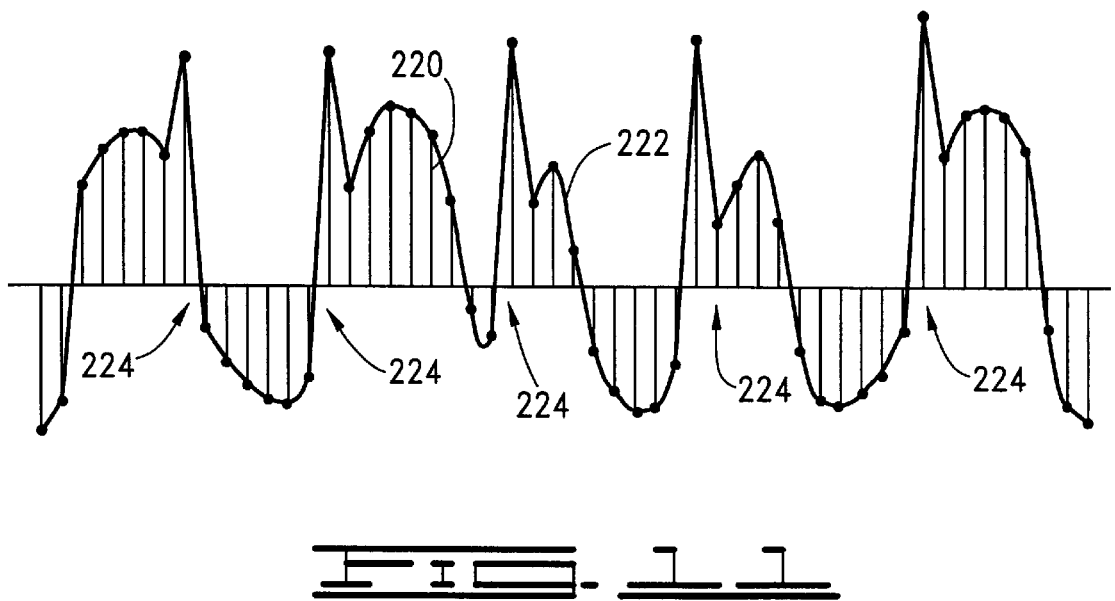
FIG. 11 is an analog and digital representation of the output signal of an optical disc created using the mastering system of FIG. 10.

Using the reading device of FIG. 8, if the disc 184 is an unauthorized replica made in accordance with the system of FIG. 10, the signal 220 of FIG. 11 is represented by the D/A output signal 202. Signal 220 of FIG. 11 illustrates the original user data signal of FIG. 2, with specific user data samples replaced by samples from the second data set in both digital 222 and analog 220 format. When the digital data signal is demodulated, lacking the CUs, the D/A fails to ignore and conceal the second data set samples, generally denoted at 224. The signal 220, having the second data set samples inserted therein, is produced, to create the output signal 220 represented by FIG. 11.

FIG. 11 illustrates a sample output signal from a typical mastering device or recording device, as shown in FIG. 10. This output signal 220 contains enough differences to prevent a user from hearing the original user data without some level of interference. Comparing this output signal 220 to signal 202 of FIG. 9, further compared with the original user data signal 110 of FIG. 2, illustrates how the copy protection prevents unauthorized duplications. During duplications made using a typical mastering device or recording device, critical uncorrectable error identifiers are not read, thus causing the replicated discs to mistake the second data set samples as proper and to produce an incorrect output signal.

Figure 12:
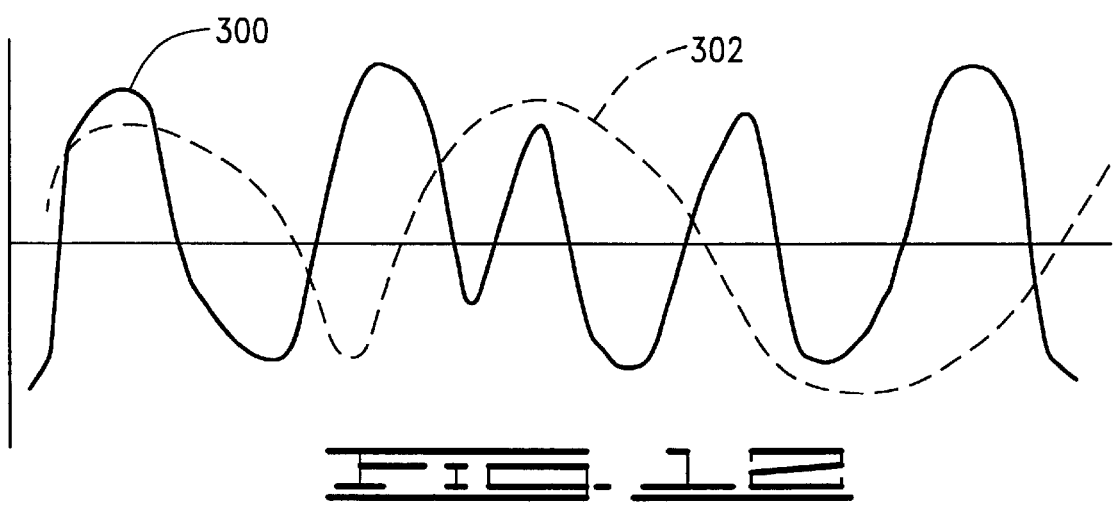
FIG. 12 is a graphical representation of two analog data signals, a user data signal and a second data set signal.

In another embodiment, the second data set may be an audible message, as illustrated in FIG. 12. Shown in FIG. 12 are two data sets, the first data set represents the user data 300 and the second data set 302 is another message. FIG. 12 illustrates a sample portion of these analog signals. The copy protection is accomplished by the overlaying of the second data signal 302 upon the user data signal 300, therefore the length of either signal 300 or 302 is dictated by the size of the message contained therein, and not restricted to the length shown in FIG. 12.

FIG. 13 illustrates a digital representation of the combination of the two analog signals of FIG. 12, 300 and 302. Data samples 304 are samples from the user data 300, and the samples 306, shown with a dashed line, are data samples from the second data set 302. Where the magnitude of a data sample 304 from the user data is within a pre-defined range, close to the zero crossing, the sample is replaced by the corresponding second data set sample 306. Also shown is a table for the sample magnitude value 308 and the error correction codes 310 for encoding the digital signal on an optical disc. At the corresponding locations of the second data set samples, 306, in the overall digital signal, CUs having been indicated in the table, denoted as 312.

The digital signal contains the full copy protection scheme of the second data set and the accompanying induced errors. Without the presence of CUs written to the corresponding second data samples 306, a D/A will properly assert these sample values in its reconstruction of the original signal. Signal 310 of FIG. 14 illustrates the analog representation of the digital signal of FIG. 13. For comparison purposes, original user data signal 300 has been overlaid. FIG. 14 readily shows the differences created in the output signal through the loss of the CUs written to the error correction codes. Where these two lines 300 and 310 diverge represents the effect the copy protection scheme has upon an unauthorized copy created using a continuous reading device.

While the above discussion has been focused on the copy protection for an optical disc, the copy protection scheme of the present invention is applicable to the digital data sequence, irrespective of the medium upon which the data is located. The copy protection scheme of the present invention may also be applicable to MPEG formats for compressed audio or video data. Also, the present copy protection scheme may be applicable to flash memory devices as well as optical storage media. As long as error correction codes are embedded within the digital data storage apparatus, the present invention provides an applicable copy protection scheme.

The present invention provides for the copy protection of a digital data file having a second data set interposed thereon. At digital data samples within a pre-defined range, the original digital data sample is substituted with a digital data sample for the second data set. At the exact locations where the second digital data set is written in place of the user data sample value, an induced error is created. Therefore, a normal reading device reading the digital data file will be instructed to ignore the data value in that location. Instead, the reading device will correct for the error using internal cover-up operations. As the pre-defined range in which user data samples are chosen for substitution is within a close approximation to the magnitude of zero, the reading device internal cover-up operations will be undetectable to the end user and thus the copy protection scheme does not interfere with the use and enjoyment of the original user data.

When the disc is read by a typical reading device for duplication purposes, the signal is demodulated and re-modulated with new error correction codes written therein. The original error correction codes are not made a part of the re-modulated output signal, nor are concealment steps taken prior to re-modulation. Therefore, CUs placed at specific locations will not be made a part of the replicated digital data file and the second data set samples are made a part of the output signal.

The present invention further provides for the second data set to be a data set intended to prevent the use of the unauthorized duplication. One embodiment of the copy protection scheme provides for the second data set to be a high-pitched noise. Other embodiments of the second data set provide for a spoken message to be overlaid with the user data, a clicking noise, or any other data track which prohibits access to the original user data signal.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for preventing the unauthorized replication of an original digital data file having user data comprising a plurality of data samples with error correction code encoded therein, wherein the original digital data file will function properly in a normal reading device and an unauthorized copy is prevented from doing so, the method comprising steps of:

(a) substituting a plurality of second data set samples in place of a plurality of the user data samples to generate a combined data set;

(b) calculating error correction codes to correct errors in the combined data set; and (c) writing an uncorrectable error to the error correction code for each second data set sample of the combined data set such that the normal reading device will read each uncorrectable error and conceal the corresponding second data set sample while outputting a compensated output sample for the concealed second data set sample, wherein an unauthorized copy of the digital data file will fail to include the uncorrectable errors in the error correction codes so that, when the unauthorized copy of the digital data file is read, the normal reading device will produce an output signal comprising the user data samples with the second data set samples intermingled therein.

2. The method of claim 1 wherein the second data set samples are non-synchronous with the user data samples.

3. The method of claim 2 wherein the second data set sample represents an audible message.

4. The method of claim 1 wherein the user data sample upon which the second data set sample is substituted therefor has a magnitude with a pre-defined range.

5. The method of claim 4 wherein a pre-defined range of the user data samples for which the second data set samples are substituted bounds a zero-crossing value.

6. The method of claim 1 wherein the method for preventing is encoded onto an optical disc.

7. An optical disc comprising:

a combined data set written to the optical disc and formed from user data comprising a plurality of user data samples and a second data set comprising a plurality of second data set samples wherein each second data set sample is substituted for a corresponding one of the plurality of user data samples;

a set of error correction codes corresponding to the combined data set; and an uncorrectable error written to each error correction code in the set of error correction codes corresponding to the second data set samples so that, when the optical disc is read by a readback system, the readback system will read each uncorrectable error and conceal the corresponding second data set sample while outputting a compensated output sample for the concealed second data set sample, wherein an unauthorized copy of the optical disc which fails to include the uncorrectable errors in the error correction codes will cause the readback system to produce an output signal comprising the user data samples with the second data set samples intermingled therein.

8. The optical disc of claim 7 wherein a pre-defined range of the user data samples for which the second data set samples are substituted bounds a zero-crossing value.

9. The optical disc of claim 8 wherein the pre-defined range is a magnitude range bounded by a zero crossing value.

10. The optical disc of claim 8 wherein the second data set is an audible message.

11. The optical disc of claim 7 wherein the user data comprises audio data.

12. The optical disc of claim 7 wherein the second data set is non-synchronous with the user data set.

13. The optical disc of claim 7 wherein the second data set represents an audible message.

14. A digital data sequence stored on a recording medium and having a copy protection scheme encoded therein, the digital data sequence comprising:
- a combined data set formed from user data comprising a plurality of user data samples and a second data set comprising a plurality of second data set samples wherein each second data set sample is substituted for a corresponding one of the plurality of user data samples;
- a set of error correction codes corresponding to the combined data set; and
- an induced error written to each error correction code in the set of error correction codes corresponding to the second data set samples so that, when the data sequence is read by a readback system, the readback system will read each induced error and conceal the corresponding second data set sample while outputting a compensated output sample for the concealed second data set sample, wherein an unauthorized copy of the data sequence which fails to include the induced errors in the error correction codes will cause the readback system to produce an output signal comprising the user data samples with the second data set samples intermingled therein.

15. The digital data sequence of claim 14 wherein a pre-defined range of the user data samples for which the second data set samples are substituted bounds a zero-crossing value.

16. The digital data sequence of claim 15 wherein the pre-defined range is a magnitude range bounded by a zero crossing value.

17. The digital data sequence of claim 14 wherein the second data set is non-synchronous with the user data set.

18. The digital data sequence of claim 14 wherein the digital data sequence is encoded onto an optical disc.

19. The digital data sequence of claim 14 wherein the second data set represents an audible message.

* * * * *